United States Patent
Katakura et al.

(10) Patent No.: US 10,309,526 B2
(45) Date of Patent: Jun. 4, 2019

(54) VEHICULAR HYDRAULIC CONTROL DEVICE AND HYDRAULIC CONTROL METHOD

(71) Applicant: JATCO Ltd, Fuji-shi, Shizuoka (JP)

(72) Inventors: Shusaku Katakura, Fujisawa (JP); Yutaka Shimizu, Atsugi (JP); Youko Yoshioka, Kanagawa (JP); Yukiyoshi Inuta, Kanagawa (JP); Tomoyuki Koike, Kanagawa (JP)

(73) Assignee: JATCO LTD, Fuji-shi (JP)

( * ) Notice: Subject to any disclaimer, the term of this patent is extended or adjusted under 35 U.S.C. 154(b) by 58 days.

(21) Appl. No.: 15/561,489

(22) PCT Filed: Mar. 9, 2016

(86) PCT No.: PCT/JP2016/057415
§ 371 (c)(1),
(2) Date: Sep. 25, 2017

(87) PCT Pub. No.: WO2016/152533
PCT Pub. Date: Sep. 29, 2016

(65) Prior Publication Data
US 2018/0106363 A1  Apr. 19, 2018

(30) Foreign Application Priority Data

Mar. 26, 2015  (JP) ................................ 2015-065275

(51) Int. Cl.
*F16H 61/00* (2006.01)
*F16H 59/14* (2006.01)
(Continued)

(52) U.S. Cl.
CPC ...... *F16H 61/0031* (2013.01); *B60Y 2200/92* (2013.01); *F16H 59/14* (2013.01); *F16H 59/18* (2013.01); *F16H 59/44* (2013.01)

(58) Field of Classification Search
CPC ...... F16H 61/0031; F16H 59/18; F16H 59/14; F16H 59/44
See application file for complete search history.

(56) References Cited

U.S. PATENT DOCUMENTS 7,951,043 B2 * 5/2011 Reisch ................ F16H 57/0434
192/113.3
8,763,736 B2 7/2014 Mochiyama et al.
(Continued)

FOREIGN PATENT DOCUMENTS

JP   2001-032917 A   2/2001
JP   2005-098468 A   4/2005
(Continued)

*Primary Examiner* — Erin D Bishop
(74) *Attorney, Agent, or Firm* — Foley & Lardner LLP (57) ABSTRACT

A hydraulic control device includes: a mechanical oil pump (O/P) that is driven by a motor/generator (M/G) and that generates a first hydraulic pressure (P1); an electric oil pump (M/O/P) that is driven by a sub-motor (S/M) and that generates a second hydraulic pressure (P2); and a controller (10). When a demanded drive force from a driver is generated while in a low-vehicle-speed region which is lower than a first vehicle speed (V1) at which the output of the mechanical oil pump (O/P) becomes unstable, the controller (10) controls the electric oil pump (M/O/P) such that the second hydraulic pressure (P2) becomes larger than a compensative hydraulic pressure (Pα) found by subtracting the first hydraulic pressure (P1) from a necessary hydraulic pressure (Pne) determined in accordance with the demanded drive force.

6 Claims, 6 Drawing Sheets

(51) Int. Cl.
　　　*F16H 59/44*　　　(2006.01)
　　　*F16H 59/18*　　　(2006.01)

(56) References Cited

U.S. PATENT DOCUMENTS

| | | | |
|---|---|---|---|
| 8,812,204 B2 * | 8/2014 | Kawaguchi | F16H 61/0031 |
| | | | 192/85.01 |
| 9,702,381 B2 * | 7/2017 | Morita | F16H 61/0031 |
| 2007/0065296 A1 | 3/2007 | Sakata et al. | |
| 2010/0241326 A1 * | 9/2010 | Muranaka | F16H 61/0031 |
| | | | 701/58 |
| 2011/0319227 A1 | 12/2011 | Kamada et al. | |
| 2012/0103709 A1 | 5/2012 | Mochiyama et al. | |

FOREIGN PATENT DOCUMENTS

| | | |
|---|---|---|
| JP | 2009-197817 A | 9/2009 |
| JP | 2011-220354 A | 11/2011 |
| JP | 2012-097813 A | 5/2012 |

\* cited by examiner

VEHICULAR HYDRAULIC CONTROL DEVICE AND HYDRAULIC CONTROL METHOD

TECHNICAL FIELD

The present invention relates to a vehicular hydraulic control device including a first oil pump and a second oil pump, wherein the first oil pump is configured to be driven by a vehicle drive source, and the second oil pump is configured to be driven by an electric motor.

BACKGROUND ART

Conventionally, a vehicular hydraulic control device is known which includes a first oil pump and a second oil pump, wherein the first oil pump is configured to be driven by a vehicle drive source, and the second oil pump is configured to be driven by an electric motor, and wherein the vehicular hydraulic control device is configured to control the first and second oil pumps based on a driver-requested driving force, in a manner to ensure a hydraulic pressure required to prevent slipping of a power transmission part such as a clutch or a variator which is disposed between the vehicle drive source and a driving wheel for transmitting power (see a patent document 1, for example).

However, during start or acceleration in a low vehicle speed region in which a rotational speed of the vehicle drive source is low, a rotational speed of the first oil pump is also low, and it may be impossible to ensure a sufficient hydraulic pressure with respect to the required hydraulic pressure only by a discharge pressure of the first oil pump. In such a situation, it is conceivable to compensate for a shortage of the discharge pressure of the first oil pump by a discharge pressure of the second oil pump. However, in the conventional vehicular hydraulic control device where the discharge pressure of the second oil pump is set to the hydraulic pressure of the shortage (quantity of compensation), it is possible that an actual hydraulic pressure based on the discharge pressures of the first and second oil pumps becomes lower than the required hydraulic pressure, due to leaking or variation in hydraulic pressure. Since the rotational speed of the vehicle drive source is low and the discharge pressure of the first oil pump is likely to vary especially in a low vehicle speed region such as in a state of vehicle start, it is possible that the discharge pressure of the first oil pump becomes lower than assumed, and the required hydraulic pressure cannot be obtained. If the required hydraulic pressure cannot be obtained, a slip may occur in the power transmission part, so that it is impossible to transmit a driver-intended driving force to driving wheels.

The present invention is targeted for providing a vehicular hydraulic control device capable of ensuring a required hydraulic pressure in response to an occurrence of a requested driving force in a low vehicle speed region in which an output of a first oil pump is unstable.

PRIOR ART DOCUMENT(S)

Patent Document(s)

Patent Document 1: JP 2012-097813 A

SUMMARY OF THE INVENTION

In order to accomplish the target described above, according to the present invention, a vehicular hydraulic control device comprises: a first oil pump configured to be driven by a vehicle drive source, and perform hydraulic pressure supply; a second oil pump configured to be driven by an electric motor other than the vehicle drive source, and perform hydraulic pressure supply; and a second oil pump controller configured to drive the second oil pump in a manner to cause a second oil pump discharge pressure to be greater than a compensation hydraulic pressure, in response to an occurrence of a driver-requested driving force when in a low vehicle speed region where a vehicle speed is lower than a first vehicle speed, wherein the compensation hydraulic pressure is obtained by subtracting a first oil pump discharge pressure from a required hydraulic pressure, wherein the required hydraulic pressure is determined in accordance with the driver-requested driving force.

In the vehicular hydraulic control device according to the present invention, even if the rotational speed of the vehicle drive source is low, and the first oil pump discharge pressure varies and becomes lower than assumed, when in the low vehicle speed region, the feature of setting the second oil pump discharge pressure greater than the compensation hydraulic pressure serves to reliably cover a shortage of the first oil pump discharge pressure with respect to the required hydraulic pressure. This serves to ensure the required hydraulic pressure, in response to an occurrence of a requested driving force when in the low vehicle speed region where the output of the first oil pump is unstable.

MODE(S) FOR CARRYING OUT THE INVENTION

The following describes a mode for carrying out a vehicular hydraulic control device according to the present invention, with reference to an embodiment shown in the drawings.

Embodiment

First, the following describes configuration of the vehicular hydraulic control device according to the embodiment, separately in sections [Whole System Configuration of Hybrid Vehicle], [Detailed Configuration of Hydraulic Control Circuit], and [Configuration of Process of Covering Required Hydraulic Pressure].

[Whole System Configuration of Hybrid Vehicle]

Figure 1:
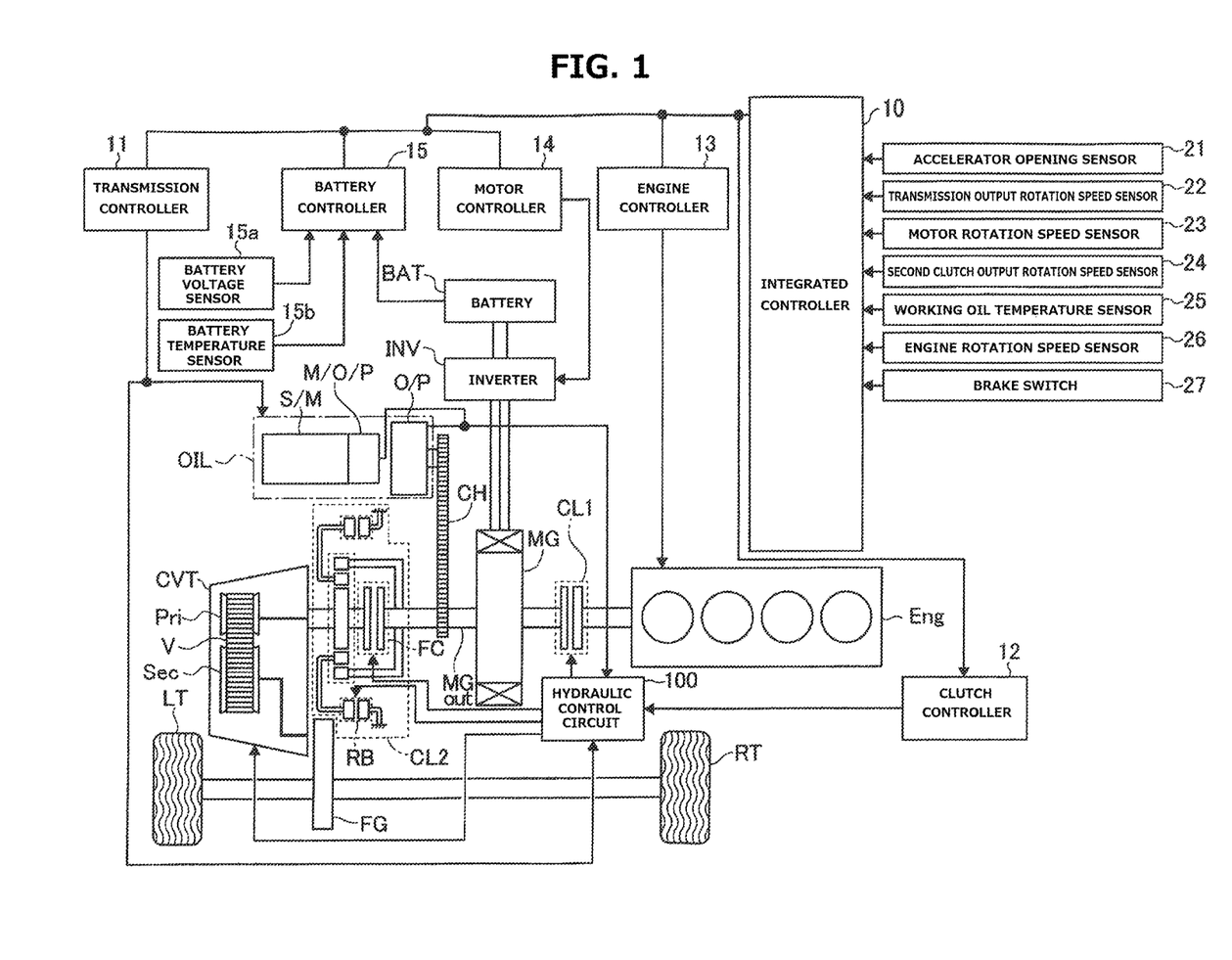
FIG. 1 is a whole system diagram showing a hybrid vehicle to which a control device according to an embodiment is applied.

FIG. 1 is a whole system diagram showing a hybrid vehicle as an example of vehicle, to which a control device according to an embodiment is applied. The following describes whole system configuration of the hybrid vehicle according to the embodiment with reference to FIG. 1.

The vehicular hydraulic control device according to the embodiment is applied to the hybrid vehicle shown in FIG. 1. The hybrid vehicle includes a driveline, wherein the driveline includes an engine "Eng", a first clutch CL1, a motor generator "MG", a second clutch CL2, a continuously variable transmission "CVT", a final gear "FG", a left driving wheel "LT", and a right driving wheel "RT".

Engine Eng is configured to perform lean-burn operation, and is controlled to conform an engine torque to a target value, by control of an intake air quantity by a throttle actuator, control of a fuel injection quantity by an injector, and control of an ignition timing by an ignition plug.

First clutch CL1 is disposed between engine Eng and motor generator MG. For example, first clutch CL1 is implemented by a dry-type clutch that is normally-opened by a biasing force of a diaphragm spring. First clutch CL1 is configured to provide complete engagement, half engagement, and disengagement between engine Eng and motor generator MG. With first clutch CL1 completely engaged, a motor torque and the engine torque are transmitted to second clutch CL2. With first clutch CL1 disengaged, only the motor torque is transmitted to second clutch CL2. The control among complete engagement/half engagement/disengagement is implemented by a stroke control of a hydraulic pressure actuator.

Motor generator MG serves as a vehicle drive source, and has an alternating current synchronous motor structure. When the vehicle is started or running, motor generator MG is controlled by a driving torque control and a rotational speed control. When the vehicle is braked or decelerating, motor generator MG is controlled by a regenerative brake control to collect a kinetic energy of the vehicle into a battery "BAT".

Second clutch CL2 is a frictional engagement element disposed between motor generator MG and left and right driving wheels LT, RT. In this example, second clutch CL2 is implemented by a hydraulically-operated wet-type multiplate friction clutch. Second clutch CL2 is controlled by a second clutch hydraulic pressure among complete engagement/slip engagement/disengagement. In the embodiment, second clutch CL2 is implemented by a forward clutch "FC" and a rearward brake "RB" which are provided in a forward-rearward switching mechanism of continuously variable transmission CVT based on a planetary gear arrangement. Namely, when the vehicle is running forward, forward clutch FC is employed as second clutch CL2, and when the vehicle is running rearward, rearward brake RB is employed as second clutch CL2.

Continuously variable transmission CVT is a belt-type continuously variable transmission including a primary pulley "Pri", a secondary pulley "Sec", and a pulley belt "V", wherein pulley belt V is wound over primary pulley Pri and secondary pulley Sec. Each of primary pulley Pri and secondary pulley Sec is supplied with a hydraulic pressure such that a pulley width varies with pulley belt V sandwiched, and the diameter of surfaces sandwiching the pulley belt V thereby varies to control a transmission ratio (pulley ratio) as desired.

Motor generator MG includes a motor output shaft "MGout" which is connected to an input gear of a mechanical oil pump "O/P" (first oil pump) via a chain "CH". Mechanical oil pump O/P is an oil pump driven by a rotational driving force of motor generator MG, and is implemented by a gear pump or a vane pump, for example. Mechanical oil pump O/P is configured to discharge working oil independently of a rotational direction of motor generator MG.

As a hydraulic pressure source, an electric oil pump "M/O/P" (second oil pump) is further provided and configured to be driven by a rotational driving force of an auxiliary motor "S/M" (electric motor) provided in addition to motor generator MG. Electric oil pump M/O/P has a three-phase alternating current motor structure, and is configured to be controlled by a rotational speed control to control a flow rate of discharged working oil.

Mechanical oil pump O/P and electric oil pump M/O/P constitute a hydraulic pressure supply source "OIL" for generating working oil pressures (control pressures) supplied to first and second clutches CL1, CL2 and continuously variable transmission CVT. In hydraulic pressure supply source OIL, electric oil pump M/O/P is stopped by stopping the auxiliary motor S/M, when the discharge flow rate from mechanical oil pump O/P is sufficient. When the discharge flow rate from mechanical oil pump O/P falls, electric oil pump M/O/P is operated by driving the auxiliary motor S/M, thereby also discharging working oil.

The hybrid vehicle thus includes a drive system of one-motor and two-clutches type including first clutch CL1, motor generator MG, and second clutch CL2. The drive system employs an EV mode and an HEV mode as main drive modes. The EV mode is an electric vehicle mode in which only motor generator MG is employed as a drive source with first clutch CL1 disengaged and second clutch CL2 engaged. The HEV mode is a hybrid vehicle mode in which engine Eng and motor generator MG are employed as drive sources with first and second clutches CL1, CL2 engaged.

In the embodiment, the hybrid vehicle includes a control system which includes an inverter "INV", battery BAT, an integrated controller 10, a transmission controller 11, a clutch controller 12, an engine controller 13, a motor controller 14, and a battery controller 15, as shown in FIG. 1.

Inverter INV is configured to perform conversion from direct current to alternating current, and thereby generate a driving current for motor generator MG. By reversing the phase of the generated driving current, output rotation of motor generator MG is reversed.

Battery BAT is a rechargeable and dischargeable secondary battery, and is configured to supply electric power to motor generator MG, and charge electric power regenerated by motor generator MG.

Integrated controller 10 is configured to calculate a target driving torque corresponding to a driver-requested driving force, based on a state of the battery (inputted from battery controller 15), an accelerator opening (sensed by an accelerator opening sensor 21), a vehicle speed (value synchronized with a transmission output rotational speed, sensed by a transmission rotational speed sensor 22). Based on the result, integrated controller 10 calculates command values for the actuators (motor generator MG, engine Eng, first clutch CL1, second clutch CL2, and continuously variable transmission CVT), and sends the command values to controllers 11 to 15. Integrated controller 10 serves as a second oil pump controller configured to control electric oil pump M/O/P. Specifically, integrated controller 10 switches a flow rate control of electric oil pump M/O/P to a first one for a state where the vehicle speed is lower than or equal to a first vehicle speed V1 described below, to a second one for a state where the vehicle speed is higher than the first vehicle speed V1 and lower than or equal to a second vehicle speed V2 described below, and a third one for a state where the vehicle speed is higher than the second vehicle speed V2.

Transmission controller 11 is configured to perform a shift control to achieve a shift command from integrated controller 10. The shift control is implemented by employing as an original pressure the line pressure PL supplied via a hydraulic control circuit 100, and controlling hydraulic pressures supplied to primary pulley Pri and secondary pulley Sec of continuously variable transmission CVT. A surplus pressure, which is caused when the hydraulic pressure supplied to primary pulley Pri and the hydraulic pressure supplied to secondary pulley Sec are generated from line pressure PL, is used to cool and lubricate the first clutch CL1 and second clutch CL2.

Clutch controller 12 is configured to receive input of a second clutch input rotational speed (sensed by a motor rotational speed sensor 23), a second clutch output rotational speed (sensed by a second clutch output rotational speed sensor 24), and a clutch oil temperature (sensed by a working oil temperature sensor 25). Clutch controller 12 is further configured to perform a first clutch control and a second clutch control to achieve a first clutch control command and a second clutch control command from integrated controller 10, respectively. The first clutch control is implemented by employing as an original pressure the line pressure PL supplied via hydraulic control circuit 100, and controlling a hydraulic pressure supplied to first clutch CL1. The second clutch control is implemented by employing as an original pressure the line pressure PL supplied via hydraulic control circuit 100, and controlling a hydraulic pressure supplied to second clutch CL2. A surplus pressure, which is caused when the hydraulic pressure supplied to first clutch CL1 and the hydraulic pressure supplied to second clutch CL2 are generated from line pressure PL, is used to cool and lubricate the first clutch CL1 and second clutch CL2.

The circuit for supplying control hydraulic pressures to primary pulley Pri and secondary pulley Sec of continuously variable transmission CVT, and second clutch CL2, based on line pressure PL as the original pressure, is referred to as a transmission mechanism use hydraulic pressure system "Sup". The circuit for cooling and lubricating the second clutch CL2 is referred to as a transmission mechanism cooling and lubricating system "Lub" (see FIG. 2).

Engine controller 13 is configured to receive input of an engine rotational speed (sensed by an engine rotational speed sensor 26), and perform a torque control of engine Eng to achieve an engine torque command value corresponding to a target engine torque from integrated controller 10.

Motor controller 14 is configured to receive input of a motor rotational speed (sensed by motor rotational speed sensor 23), and control the motor generator MG to achieve a motor torque command value and a motor rotational speed command value corresponding to a target motor torque from integrated controller 10.

Furthermore, the embodiment is configured to perform an idle stop control to stop both of engine Eng and motor generator MG while an idle stop condition is satisfied where the vehicle is stationary with an accelerator-off state (sensed by an accelerator opening sensor 21) and a brake-on state (sensed by a brake switch 27). While the idle stop condition is satisfied, auxiliary motor S/M is also stopped.

Battery controller 15 is configured to manage the state of charge of battery BAT, and send information of the state of charge of battery BAT to integrated controller 10. The state of charge of battery BAT is calculated based on a power supply voltage sensed by a battery voltage sensor 15a and a battery temperature sensed by a battery temperature sensor 15b.

[Detailed Configuration of Hydraulic Control Circuit]

Figure 2:
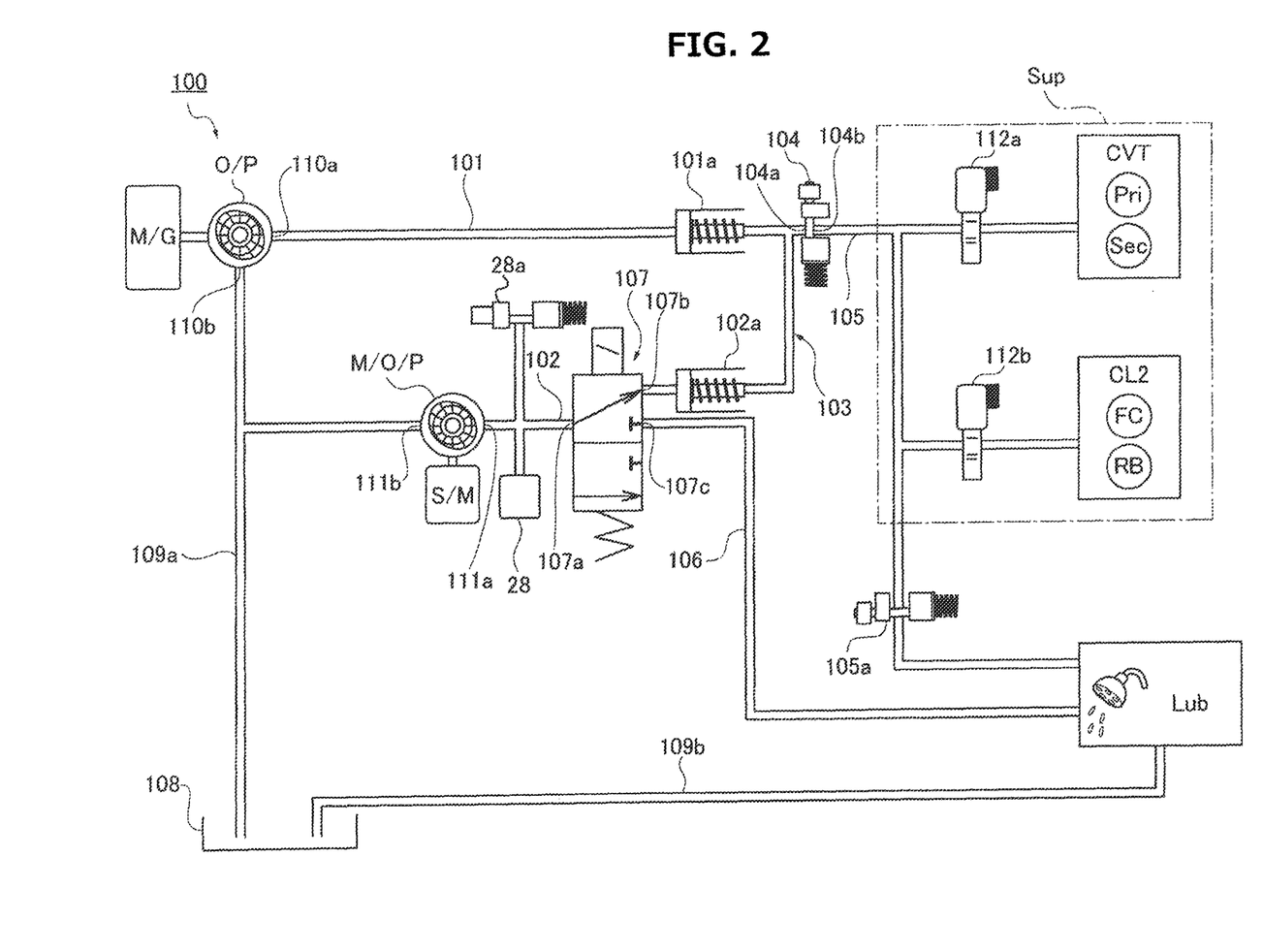
FIG. 2 is a hydraulic circuit diagram showing a hydraulic control circuit provided in the hybrid vehicle according to the embodiment.

FIG. 2 is a hydraulic circuit diagram showing a hydraulic control circuit provided in the hybrid vehicle according to the embodiment. The following describes detailed configuration of the hydraulic control circuit according to the embodiment with reference to FIG. 2.

Hydraulic control circuit 100 is configured to regulate a discharge pressure of hydraulic pressure supply source OIL, which is composed of mechanical oil pump O/P and electric oil pump M/O/P, to line pressure PL, and supply the line pressure PL to transmission mechanism use hydraulic pressure system Sup. Hydraulic control circuit 100 is further configured to supply the transmission mechanism cooling and lubricating system Lub with a surplus pressure caused when hydraulic pressure is supplied to transmission mechanism use hydraulic pressure system Sup. Hydraulic control circuit 100 is further configured to directly supply the transmission mechanism cooling and lubricating system Lub with working oil discharged from electric oil pump M/O/P, by switching a switching valve 107. Specifically, as shown in FIG. 2, hydraulic control circuit 100 according to the embodiment includes mechanical oil pump O/P, electric oil pump M/O/P, a first oil passage 101, a first flapper valve 101a, a second oil passage 102, a second flapper valve 102a, a third oil passage 103, a line pressure regulation valve 104 (pressure regulation valve), a line pressure oil passage 105, a cooling system oil passage 106, and switching valve 107.

Mechanical oil pump O/P includes a discharge port 110a connected to first oil passage 101, and includes a suction port 110b connected to a suction circuit 109a, wherein suction circuit 109a sucks working oil collected in an oil pan 108. Mechanical oil pump O/P is configured to be driven by rotational drive of motor generator MG, and suck working oil from oil pan 108 via suction circuit 109a, and discharge working oil to first oil passage 101. The discharge flow rate of mechanical oil pump O/P depends on the rotational speed of motor generator MG. Namely, the flow rate of discharge from mechanical oil pump O/P per one rotation of mechanical oil pump O/P has a unique value, so that the pump rotational speed is proportional to the pump discharge flow rate in a range of the rotational speed (flow rate) up to a specific value.

Electric oil pump M/O/P includes a discharge port 111a connected to second oil passage 102, and includes a suction port 111b connected to suction circuit 109a, wherein suction circuit 109a sucks working oil collected in oil pan 108. Electric oil pump M/O/P is configured to be driven by rotational drive of auxiliary motor S/M, and suck working oil from oil pan 108 via suction circuit 109a, and discharge working oil to second oil passage 102. The discharge flow rate of electric oil pump M/O/P depends on the pump rotational speed. Namely, the flow rate of discharge from electric oil pump M/O/P per one rotation of electric oil pump M/O/P has a unique value, so that the pump rotational speed is proportional to the pump discharge flow rate in a range of the rotational speed (flow rate) up to a specific value. Accordingly, determining a target rotational speed for electric oil pump M/O/P is equivalent to commanding a flow rate for electric oil pump M/O/P. In the embodiment, electric oil pump M/O/P is implemented by an oil pump having a larger discharge flow rate than a typical electric oil pump employed only for an idle stop control, namely, an oil pump capable of ensuring hydraulic pressures for engagement/disengagement control of second clutch CL2 and shifting of continuously variable transmission CVT only with the discharge flow rate of electric oil pump M/O/P (second hydraulic pressure P2). Accordingly, at vehicle start, it is unnecessary to drive the mechanical oil pump O/P, but it is sufficient to drive only electric oil pump M/O/P.

First oil passage 101 includes a first end connected to discharge port 110a of mechanical oil pump O/P, and a second end provided with first flapper valve 101a. First oil passage 101 is an oil passage through which working oil discharged from mechanical oil pump O/P flows. The hydraulic pressure in first oil passage 101 (henceforth referred to as first hydraulic pressure P1) is equal to the hydraulic pressure supplied from mechanical oil pump O/P (first oil pump discharge pressure). The first hydraulic pressure P1 is proportional to the rotational speed (discharge flow rate) of mechanical oil pump O/P. With first flapper valve 101a opened, first oil passage 101 communicates with third oil passage 103.

Second oil passage 102 includes a first end connected to discharge port 111a of electric oil pump M/O/P, and a second end provided with second flapper valve 102a. Second oil passage 102 is an oil passage through which working oil discharged from electric oil pump M/O/P flows. The hydraulic pressure in second oil passage 102 (henceforth referred to as second hydraulic pressure P2) is equal to the hydraulic pressure supplied from electric oil pump M/O/P (second oil pump discharge pressure). The second hydraulic pressure P2 is proportional to the rotational speed (discharge flow rate) of electric oil pump M/O/P. With second flapper valve 102a opened, second oil passage 102 communicates with third oil passage 103. Second oil passage 102 includes an intermediate section where switching valve 107 is provided. Namely, second oil passage 102 is separated at the intermediate section into a first part connected to a switching valve input port 107a of switching valve 107, and a second part connected to a switching valve output port 107b of switching valve 107. Furthermore, second oil passage 102 is provided with a second pressure sensor 28 for sensing the second hydraulic pressure P2, and a pressure leak valve 28a. When the second hydraulic pressure P2 monitored by second pressure sensor 28 reaches a predetermined relief pressure, pressure leak valve 28a opens to drain working oil from second oil passage 102.

First flapper valve 101a is a valve configured to prevent working oil from reversely flowing to mechanical oil pump O/P, and has a characteristic that first flapper valve 101a opens when the first hydraulic pressure P1 becomes higher than the hydraulic pressure in third oil passage 103 (henceforth referred to as third hydraulic pressure P3). Second flapper valve 102a is a valve configured to prevent working oil from reversely flowing to electric oil pump M/O/P, and has a characteristic that second flapper valve 102a opens when second hydraulic pressure P2 becomes higher than third hydraulic pressure P3. The magnitude of third hydraulic pressure P3 is determined by the higher one of first hydraulic pressure P1 and second hydraulic pressure P2. Namely, one of first and second flapper valves 101a, 102a corresponding to the higher one of first hydraulic pressure P1 and second hydraulic pressure P2 is opened, while the other closed. Accordingly, third hydraulic pressure P3 becomes equal to the hydraulic pressure of the side with the corresponding flapper valve opened. When there is no difference in hydraulic pressure between first hydraulic pressure P1 and second hydraulic pressure P2, both of first and second flapper valves 101a, 102a are opened. When one of first hydraulic pressure P1 and second hydraulic pressure P2 becomes higher from the state of no difference in hydraulic pressure, the opening of the flapper valve corresponding to the higher hydraulic pressure increases, while the other flapper valve closes gradually, based on the difference in hydraulic pressure.

Third oil passage 103 includes a first end branched into a first part connected to first flapper valve 101a, and a second part connected to second flapper valve 102a, to allow inflow of working oil from first oil passage 101 and second oil passage 102. Third oil passage 103 includes a second end connected to an input port 104a of line pressure regulation valve 104. Namely, third oil passage 103 is an oil passage through which working oil discharged from hydraulic pressure supply source OIL (mechanical oil pump O/P and/or electric oil pump M/O/P) flows. The third hydraulic pressure P3, which is a hydraulic pressure in third oil passage 103, is an original pressure which is regulated by line pressure regulation valve 104 to produce the line pressure PL.

Line pressure regulation valve 104 is a pressure regulation valve configured to regulate the third hydraulic pressure P3, and thereby produce the line pressure PL supplied to transmission mechanism use hydraulic pressure system Sup. Specifically, line pressure regulation valve 104 includes input port 104a connected to third oil passage 103, and includes an output port 104b connected to a line pressure oil passage 105 leading to transmission mechanism use hydraulic pressure system Sup. The line pressure PL is regulated by line pressure regulation valve 104 based on a command value from integrated controller 10, by moving a spool, and causing working oil in third oil passage 103 to escape into a drain circuit not shown.

In order for line pressure regulation valve 104 to suitably perform pressure regulation while preventing the line pressure PL from hunting, it is required not to move the spool rapidly. Namely, it is required to prevent the rate of inflow of working oil flowing into line pressure regulation valve 104 from exceeding a valve response speed which is uniquely determined for each valve.

Line pressure oil passage 105 is an oil passage through which working oil regulated to line pressure PL by line pressure regulation valve 104 flows. Line pressure oil passage 105 is provided with a pressure regulation valve 105a configured to cause a surplus pressure, which is obtained by subtracting a hydraulic pressure required by transmission mechanism use hydraulic pressure system Sup from line pressure PL, to escape into transmission mechanism cooling and lubricating system Lub.

Cooling system oil passage 106 includes a first end connected to a cooling side port 107c of switching valve 107, and a second end connected to transmission mechanism cooling and lubricating system Lub, and is configured to supply the transmission mechanism cooling and lubricating system Lub with the working oil discharged from electric oil pump M/O/P, when switching valve 107 is switched into a cooling mode. The working oil used in transmission mechanism cooling and lubricating system Lub is collected in oil pan 108 via a drain circuit 109b.

Switching valve 107 is provided in second oil passage 102, and is configured to supply working oil discharged from electric oil pump M/O/P to third oil passage 103 or to transmission mechanism cooling and lubricating system Lub, based on a switching command from integrated controller 10. Specifically, switching valve 107 includes an on-off solenoid valve and a switching valve, and is configured to completely open the second oil passage 102 by causing the switching valve input port 107a to communicate with switching valve output port 107b. With switching valve input port 107a caused to communicate with cooling side port 107c, switching valve 107 switches from second oil passage 102 to cooling system oil passage 106.

Transmission mechanism use hydraulic pressure system Sup includes a transmission use pressure regulation valve 112a, and a second clutch use pressure regulation valve 112b, which are provided in line pressure oil passage 105. Transmission use pressure regulation valve 112a is configured to regulate line pressure PL as an original pressure into hydraulic pressures supplied to primary pulley Pri and secondary pulley Sec, and supply the regulated hydraulic pressures to primary pulley Pri and secondary pulley Sec. Second clutch use pressure regulation valve 112b is configured to regulate line pressure PL as an original pressure into hydraulic pressures supplied to forward clutch FC and rearward brake RB, and supply the regulated hydraulic pressures to forward clutch FC and rearward brake RB.

[Configuration of Process of Covering Required Hydraulic Pressure]

Figure 3:
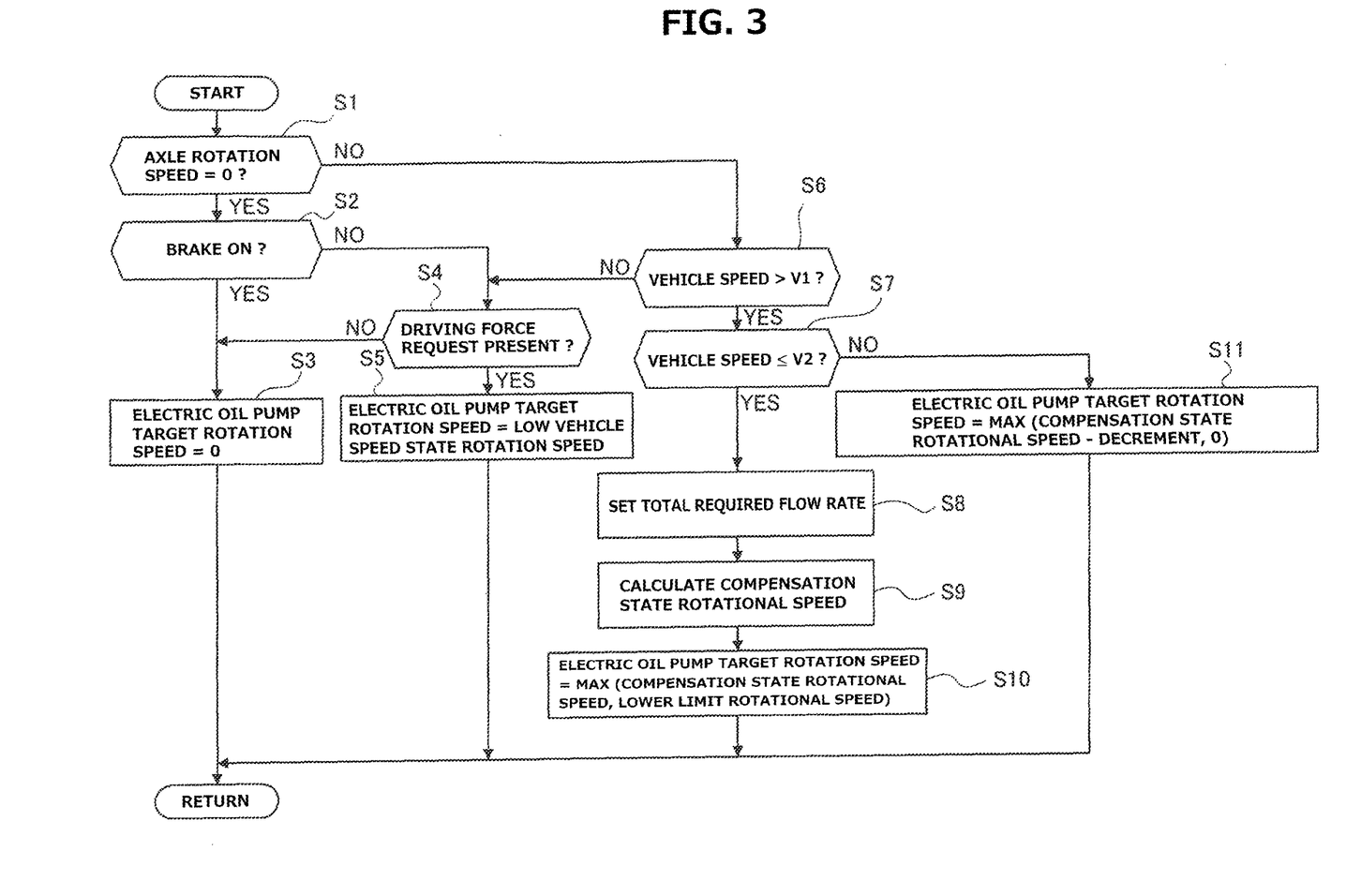
FIG. 3 is a flow chart showing a flow of a process of covering a required hydraulic pressure, which is executed by an integrated controller according to the embodiment.

FIG. 3 is a flow chart showing a flow of a process of covering a required hydraulic pressure, which is executed by the integrated controller according to the embodiment. The following describes steps of FIG. 3 showing configuration of the required hydraulic pressure covering process according to the embodiment.

At Step S1, the integrated controller determines whether or not a rotational speed of an axle is equal to zero, namely, whether or not the vehicle is stationary. In case of YES (the axle rotational speed=0), it determines that the vehicle is stationary, and then proceeds to Step S2. In case of NO (the axle rotational speed>0), it determines that the vehicle is running, and then proceeds to Step S6. The rotational speed of the axle is determined based on the second clutch output rotational speed sensed by second clutch output rotational speed sensor 24.

At Step S2, following the determination at Step S1 that the axle rotational speed is equal to zero, it determines whether or not the brake is in on-state, namely, whether or not the brake is depressed. In case of YES (the brake is on), it determines the vehicle is completely stationary and no driver's request for driving force is present, and then proceeds to Step S3. In case of NO (the brake is off), it proceeds to Step S4. The state of the brake is sensed by brake switch 27.

At Step S3, following the determination at Step S2 that the brake is in on-state, or following a determination at Step S4 that no driver's request for driving force is present, it sets the target rotational speed of electric oil pump M/O/P to zero, and stops auxiliary motor S/M, and proceeds to the return. In this situation, for carrying out the idle stop control, motor generator MG is also stopped. By this operation, driving of mechanical oil pump O/P and electric oil pump M/O/P is stopped so that hydraulic pressure supply source OIL stops supplying working oil. The stop of supply of working oil from hydraulic pressure supply source OIL causes working oil to be drained from third oil passage 103, line pressure oil passage 105, and the circuit in transmission mechanism use hydraulic pressure system Sup, thereby lowering the line pressure PL and the hydraulic pressures supplied to primary pulley Pri, secondary pulley Sec, and second clutch CL2 (forward clutch FC or rearward brake RB).

At Step S4, following the determination at Step S3 that the brake is in off-state, or following a determination at Step S6 that the vehicle speed≤first vehicle speed V1, it determines whether or not driver's request for driving force occurs. In case of YES (driver's request for driving force is present), it determines that it is required to quickly supply hydraulic pressure to hydraulic control circuit 100, and then proceeds to Step S5. In case of NO (driver's request for driving force is absent), it determines that it is unnecessary to quickly supply hydraulic pressure to hydraulic control circuit 100, and then returns to Step S3. The presence and absence of driver's request for driving force is determined based on the on/off state of the accelerator opening. When the accelerator opening is in on-state, it is determined that driver's request for driving force is present. The accelerator opening is sensed by accelerator opening sensor 21. It may be determined that driver's request for driving force is present, in response to a condition that the accelerator opening becomes greater than or equal to a predetermined value, or a condition that the rate of change of the accelerator opening becomes greater than or equal to a predetermined value (at rapid depression).

At Step S5, following the determination at Step S4 that driver's request for driving force is present, it sets the target rotational speed of electric oil pump M/O/P is to a predetermined low vehicle speed state rotational speed "Nmax", and then proceeds to the return. The low vehicle speed state rotational speed Nmax is equal to a maximum rotational speed of electric oil pump M/O/P, and a value for setting the second hydraulic pressure P2 to a maximum output pressure (the relief pressure at which pressure leak valve 28a opens). The maximum output pressure is greater than a compensation hydraulic pressure Pα that is obtained by subtracting the first hydraulic pressure P1 from a required hydraulic pressure "Pne", wherein the required hydraulic pressure Pne is determined in accordance with a driver-requested driving force. The required hydraulic pressure Pne is a minimum hydraulic pressure required to transmit a torque, which is generated by a vehicle drive source (engine Eng, motor generator MG) based on the driver-requested driving force, through the continuously variable transmission CVT and second clutch CL2. The required hydraulic pressure Pne is set to increase as the driver-requested driving force (whose magnitude is determined based on the accelerator opening) increases.

At Step S6, following the determination at Step S1 that the axle rotational speed>0, it determines whether or not the vehicle speed is higher than or equal to the predetermined first vehicle speed V1. In case of YES (the vehicle speed>first vehicle speed V1), it proceeds to Step S7. In case of NO (the vehicle speed≤first vehicle speed V1), it proceeds to Step S4. The first vehicle speed V1 is an upper limit value of a low vehicle speed region in which the discharge flow rate of mechanical oil pump O/P varies due to low speed rotation of mechanical oil pump O/P, and is set to a value of 2 to 3 km/h in this example. If the rotational speed of mechanical oil pump O/P which is implemented by a vane pump for example is too low, a vane cannot move out of a groove of a rotor where vane is put, and cannot discharge working oil. However, a pump rotational speed enabling the vane to move out varies depending on the state of the pump and the state of working oil (temperature, viscosity, etc.), so that the discharge flow rate varies even when the pump rotational speed is the same. Accordingly, it cannot rely on the discharge flow rate of mechanical oil pump O/P in the low vehicle speed region below the first vehicle speed V1.

At Step S7, following the determination at Step S6 that the vehicle speed>first vehicle speed V1, it determines whether or not the vehicle speed is lower than or equal to the predetermined second vehicle speed. In case of YES (the vehicle speed≤second vehicle speed V2), it determines that both of mechanical oil pump O/P and electric oil pump M/O/P are required for hydraulic pressure supply, and then proceeds to Step S8. In case of NO (the vehicle speed>second vehicle speed V2), it determines that required hydraulic pressure Pne can be covered only by hydraulic pressure supply of mechanical oil pump O/P, and then proceeds to Step S11. The second vehicle speed V2 is a vehicle speed at which the discharge flow rate of mechanical oil pump O/P is stable, and it can be determined that required hydraulic pressure Pne can be covered only by hydraulic pressure supply of mechanical oil pump O/P, and is set to 10 km/h in this example.

Figure 4:
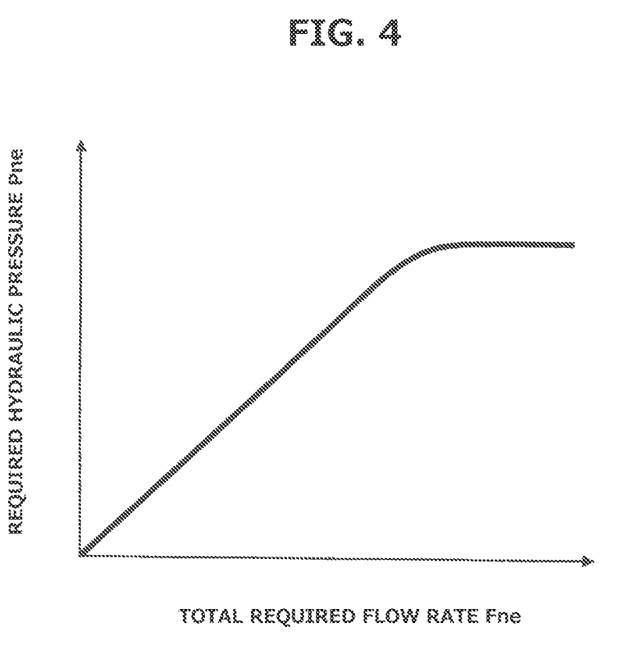
FIG. 4 is a characteristic line diagram showing a required flow rate table showing a relationship between a required hydraulic pressure and a total required flow rate which is determined in accordance with a driver-requested driving force.

At Step S8, following the determination at Step S7 that the vehicle speed≤second vehicle speed V2, it sets a total required flow rate "Fne" of hydraulic pressure supply source OIL required to cover the required hydraulic pressure Pne determined in accordance with the deriver-requested driving force, and proceeds to Step S9. The total required flow rate Fne is set based on a required flow rate table shown in FIG. 4 which shows a relationship between total required flow rate Fne and required hydraulic pressure Pne. During setting the total required flow rate Fne, a target driving torque is first calculated in accordance with the requested driving force. Then, the target driving torque is converted into required hydraulic pressure Pne, and total required flow rate Fne is set by using the required flow rate table of FIG. 4. The target driving torque corresponding to the driver-requested driving force is calculated based on the state of the battery, the accelerator opening, and the vehicle speed.

At Step S9, following the operation at Step S8 that the total required flow rate Fne is set, it calculates a compensation state rotational speed Nα of electric oil pump M/O/P required to discharge a compensation flow rate Fα, based on the total required flow rate Fne calculated at Step S8 and the discharge flow rate of mechanical oil pump O/P, and then proceeds to Step S10. The compensation flow rate Fα is a flow rate required to be covered by electric oil pump M/O/P for ensuring the required hydraulic pressure Pne, and is equal to a value obtained by subtracting the discharge flow rate of mechanical oil pump O/P from total required flow rate Fne. The compensation state rotational speed Nα is a rotational speed of electric oil pump M/O/P required to discharge the compensation flow rate Fα, and is calculated by the following equation (1).

[compensation flow rate $F\alpha$]=([total required flow rate $Fne$]−[the rotational speed of the mechanical oil pump]×[a conversion coefficient for the compensation flow rate of the mechanical oil pump]/[a conversion coefficient for the discharge flow rate of the electric oil pump]   (1)

The rotational speed of the mechanical oil pump is calculated from the rotational speed of motor generator MG sensed by motor rotational speed sensor 23. The conversion coefficient for the compensation flow rate of the mechanical oil pump is a flow rate of working oil discharged by mechanical oil pump O/P per one rotation, and is preset for each mechanical oil pump O/P. The conversion coefficient for the discharge flow rate of the electric oil pump is a flow rate of working oil discharged by electric oil pump M/O/P per one rotation, and is preset for each electric oil pump M/O/P.

At Step S10, following the operation at Step S9 that the compensation state rotational speed Nα is calculated, it sets the target rotational speed of the electric oil pump to the higher one of the compensation state rotational speed Nα calculated at Step S9 and a preset lower limit rotational speed "Nmin", and then proceeds to the return. The lower limit rotational speed Nmin is set based on the valve response speed of line pressure regulation valve 104 at which line pressure regulation valve 104 can perform normal pressure regulation.

Figure 5A:
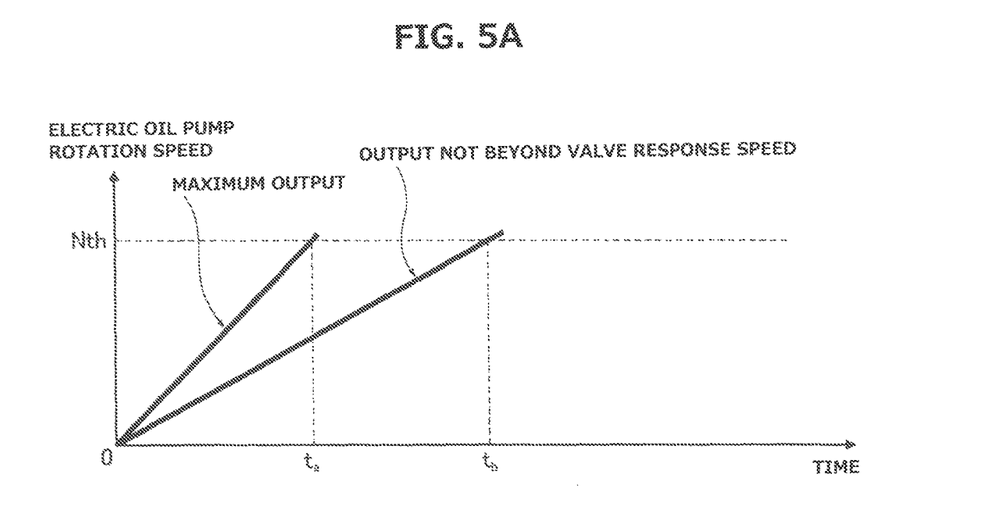
FIG. 5A is a characteristic diagram showing a function of hydraulic pressure supply by an electric oil pump.

If working oil flows into line pressure regulation valve 104 beyond the valve response speed, the spool of line pressure regulation valve 104 rapidly moves so that the line pressure PL causes hunting (a phenomenon of repetition of overshooting and undershooting). The undershooting of line pressure PL may cause line pressure PL to be below the required hydraulic pressure Pne. Accordingly, an upper limit of the gradient of rise is set to prevent the speed of inflow of working oil into line pressure regulation valve 104 from going beyond the valve response speed. On the other hand, with regard to electric oil pump M/O/P, as shown in FIG. 5A, when the pump rotational speed is increased from zero to a target rotational speed "Nth", the pump rotational speed can be raised in a predetermined time period "ta" if electric oil pump M/O/P is driven by the maximum output. However, in this case, the gradient of rise of the rotational speed is larger than the gradient of rise of the inflow of working oil into line pressure regulation valve 104 which is limited not to be beyond the valve response speed. Accordingly, if the rotational speed of electric oil pump M/O/P is rapidly increased and driven by the maximum output, it is possible that normal pressure regulation cannot be performed by line pressure regulation valve 104, and the transmission capacity of the power transmission part such as continuously variable transmission CVT and second clutch CL2 becomes short to cause slipping. If electric oil pump M/O/P is driven by an output not beyond the valve response speed of line pressure regulation valve 104, and the gradient of rise of the rotational speed of electric oil pump M/O/P is conformed to the gradient of rise of the speed of inflow of working oil into line pressure regulation valve 104 which is limited not to be beyond the valve response speed, it takes a time period "tb" for raising the pump rotational speed from zero to the target rotational speed Nth.

Figure 5B:
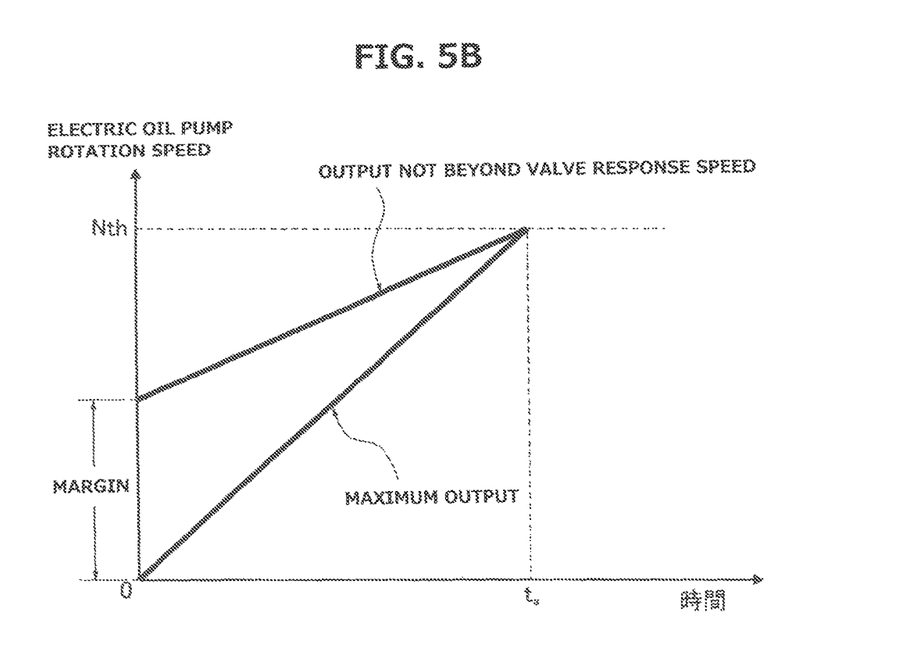
FIG. 5B is an illustrative diagram illustrating providing a rotational speed of the electric oil pump with a margin.

In order to raise the pump rotational speed from zero to the target rotational speed Nth in the same time period (ta) as in the case of drive based on the maximum output while suppressing the output of electric oil pump M/O/P from being beyond the valve response speed of line pressure regulation valve 104, it is required to provide an initial value of the rotational speed of the electric oil pump (a rotational speed at start of rise of the rotational speed) with a margin as shown in FIG. 5B. The rotational speed of the margin is equal to the lower limit rotational speed Nmin. The providing the rotational speed of electric oil pump M/O/P with the margin (lower limit value) serves to allow line pressure regulation valve 104 to perform normal pressure regulation, and prevent shortage of the transmission capacity of the power transmission part such as continuously variable transmission CVT, even when required hydraulic pressure Pne rises in response to a request for acceleration or the like.

In the case where the target rotational speed of the electric oil pump is set to the lower limit rotational speed Nmin, the second hydraulic pressure P2 is set to the lower limit hydraulic pressure Pmin, wherein the lower limit hydraulic pressure Pmin is set based on the valve response speed of line pressure regulation valve 104 at which suitable pressure regulation control can be performed by line pressure regulation valve 104, because the second hydraulic pressure P2 is proportional to the rotational speed of electric oil pump M/O/P. In the case where the target rotational speed of the electric oil pump is set to compensation state rotational speed Nα, the second hydraulic pressure P2 is set to the compensation hydraulic pressure Pα, wherein the compensation hydraulic pressure Pα is obtained by subtracting the first hydraulic pressure P1 from the required hydraulic pressure Pne.

At Step S11, following the determination at Step S7 that the vehicle speed>the second vehicle speed V2, it sets target rotational speed of the electric oil pump to the greater one of zero and a value that is obtained by subtracting a predetermined decrement from the compensation state rotational speed Nα calculated at Step S9, and then proceeds to the return. This reduces the second hydraulic pressure P2 gradually to a stop, as the vehicle speed exceeds the second vehicle speed V2.

The following describes actions of the vehicular hydraulic control device according to the embodiment, separately in sections [Actions of Covering Required Hydraulic Pressure at Vehicle Start], and [Other Characteristic Actions].

[Actions of Covering Required Hydraulic Pressure at Vehicle Start]

Figure 6:
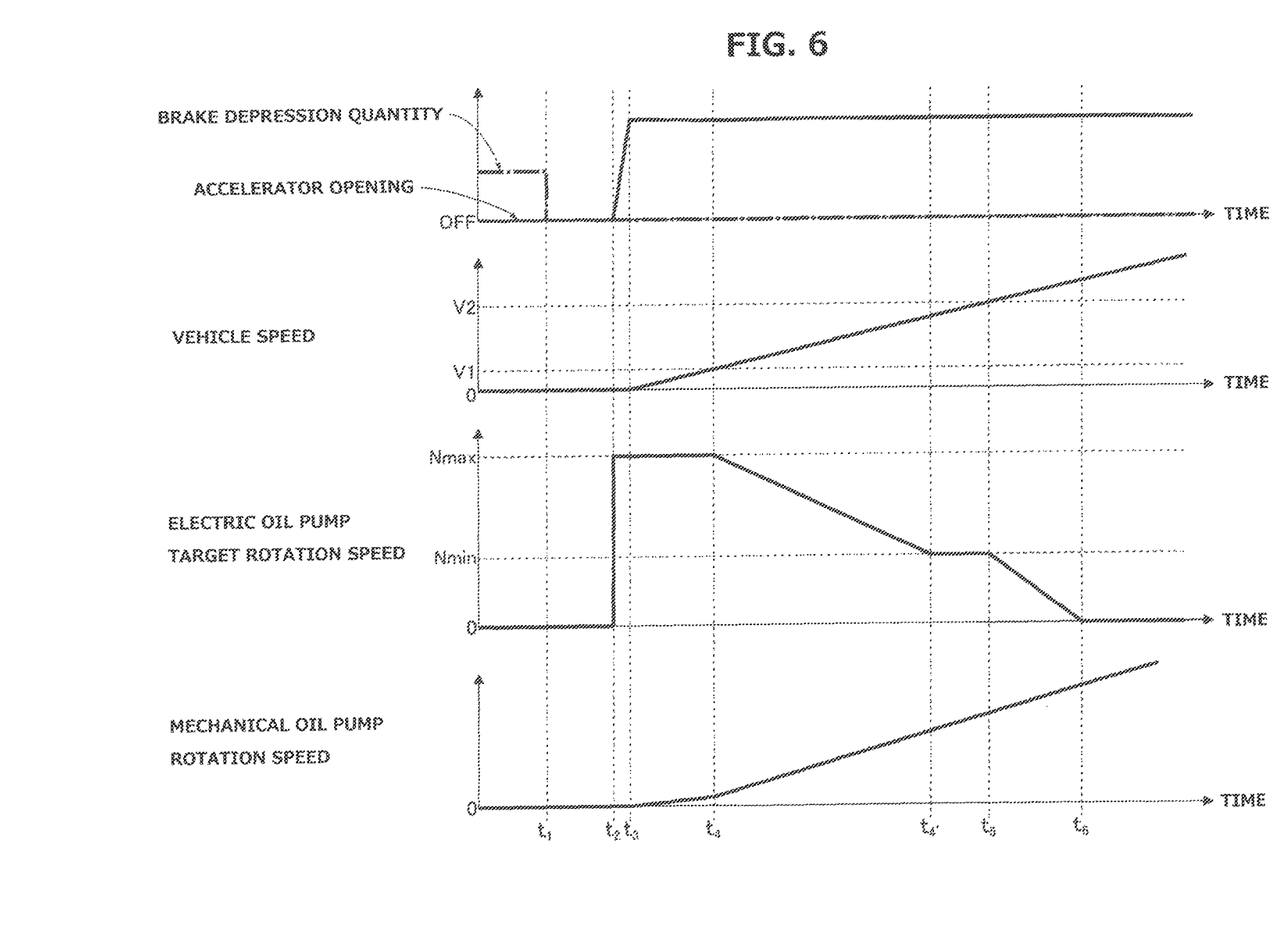
FIG. 6 is a time chart showing characteristics of an accelerator opening, a brake depression quantity, a vehicle speed, a target rotational speed of an electric oil pump, and a rotational speed of a mechanical oil pump, at vehicle start, with the control device according to the embodiment.

FIG. 6 is a time chart showing characteristics of the accelerator opening, a brake depression quantity, the vehicle speed, the target rotational speed of the electric oil pump, and the rotational speed of the mechanical oil pump, at vehicle start, with the control device according to the embodiment. The following describes actions of covering the required hydraulic pressure at vehicle start with reference to FIG. 6.

In the time chart of FIG. 6, until a time instant t1, the vehicle speed is equal to zero with the brake depressed. Namely, the axle rotational speed is equal to zero, and the brake is in on-state. Accordingly, it proceeds as Step S1→Step S2→Step S3 in the flow chart of FIG. 3, where the target rotational speed of electric oil pump M/O/P is set to zero, to stop the auxiliary motor S/M. In this situation, under the assumption that the idle stop control is performed, motor generator MG is stopped, to stop also mechanical oil pump O/P. This causes the supply of working oil from hydraulic pressure supply source OIL to be stopped, and causes the working oil filling the line pressure oil passage 105 and others to be drained.

Thereafter, at time instant t1, the brake is put in off-state, but the accelerator pedal is not depressed. Accordingly, it proceeds as Step S1→Step S2→Step S4→Step S3, where the target rotational speed of electric oil pump M/O/P remains equal to zero, and auxiliary motor S/M remains in its stopped state.

At a time instant t2 when it is determined that a driver-requested driving force is presented by depression of the accelerator pedal, it proceeds as Step S4→Step S5, where operation of auxiliary motor S/M is started, and the target rotational speed of electric oil pump M/O/P is set to the low vehicle speed state rotational speed Nmax. Then, at a time instant t3, the axle starts to rotate, so that the vehicle speed starts to increase. However, until a time instant t4 when the vehicle speed reaches the first vehicle speed V1, it proceeds as Step S1→Step S6→Step S4→Step S5, where the target rotational speed of electric oil pump M/O/P continues to be set to the low vehicle speed state rotational speed Nmax.

At a time instant t4 when the vehicle exceeds the first vehicle speed V1, it proceeds as Step S6→Step S7. Until a time instant t5 when the vehicle speed reaches the second vehicle speed V2, it proceeds as Step S7→Step S8→Step S9→Step S10, where the target rotational speed of electric oil pump M/O/P is set to the greater one of the predetermined lower limit rotational speed Nmin and the compensation state rotational speed Nα, wherein the compensation state rotational speed Nα is required to discharge the compensation flow rate Fα that is obtained by subtracting the discharge flow rate of mechanical oil pump O/P from the total required flow rate Fne.

Specifically, in FIG. 6, during a period from time instant t4 to a time instant t4', the compensation state rotational speed Nα is higher than the lower limit rotational speed Nmin, so that the target rotational speed of electric oil pump M/O/P is set to the compensation state rotational speed Nα. The compensation state rotational speed Nα is determined in accordance with the difference between the total required flow rate Fne and the discharge flow rate of mechanical oil pump O/P, so that as the rotational speed of mechanical oil pump O/P increases and the discharge flow rate of mechanical oil pump O/P increases with an increase of the vehicle speed, the compensation state rotational speed Nα decreases gradually. During a period from time instant t4' to a time instant t5, the compensation state rotational speed Nα is lower than lower limit rotational speed Nmin, so that the target rotational speed of electric oil pump M/O/P is set to the lower limit rotational speed Nmin. Accordingly, until the vehicle speed reaches the second vehicle speed V2, the target rotational speed of electric oil pump M/O/P is maintained at the lower limit rotational speed Nmin, irrespective of the discharge flow rate of mechanical oil pump O/P.

At time instant t5 when the vehicle speed exceeds the second vehicle speed V2, it proceeds as Step S7→Step S11, where the target rotational speed of electric oil pump M/O/P is set to the greater one of zero and the value obtained by subtracting the predetermined decrement from the compensation state rotational speed Nα. Accordingly, the target rotational speed of electric oil pump M/O/P decreases gradually, and becomes equal to zero at a time instant t6, when auxiliary motor S/M is stopped to terminate supply of working oil from electric oil pump M/O/P.

In this way, according to the embodiment, the target rotational speed of electric oil pump M/O/P continues to be set to the low vehicle speed state rotational speed Nmax, while in the low vehicle speed region (zero to V1) in which the rotational speed of mechanical oil pump O/P is low, and the output of mechanical oil pump O/P is unstable (it is impossible to rely on the discharge flow rate of working oil from mechanical oil pump O/P), after the occurrence of the driver's request for driving force.

The low vehicle speed state rotational speed Nmax is equal to the maximum rotational speed of electric oil pump M/O/P, which sets the second hydraulic pressure P2 to the maximum output pressure. The maximum output pressure is greater than the compensation hydraulic pressure Pα, wherein the compensation hydraulic pressure Pα is obtained by subtracting the first hydraulic pressure P1 from the required hydraulic pressure Pne, wherein the required hydraulic pressure Pne is determined in accordance with the driver-requested driving force. This serves to set the second hydraulic pressure P2 greater than the compensation hydraulic pressure Pα by driving the electric oil pump M/O/P at the maximum rotational speed, when in the low vehicle speed region where the output of mechanical oil pump O/P is unstable. As a result, even when the first hydraulic pressure P1 becomes lower than assumed, due to variation of the discharge flow rate from mechanical oil pump O/P, it is possible to reliably cover the shortage of first hydraulic pressure P1 with respect to the required hydraulic pressure Pne by the second hydraulic pressure P2. This serves to ensure the required hydraulic pressure Pne in response to the occurrence of a requested driving force when in the low vehicle speed region. With required hydraulic pressure Pne ensured, it is possible to prevent the occurrence of slipping of the power transmission pat such as the primary pulley Pri and secondary pulley Sec of continuously variable transmission CVT, and second clutch CL2, and thereby allow the driver-intended driving torque to be transmitted to left and right driving wheels LT, RT.

Furthermore, according to the embodiment, the low vehicle speed state rotational speed Nmax is equal to the maximum rotational speed of electric oil pump M/O/P which sets the second hydraulic pressure P2 to the maximum output pressure. For example, in a drive scene where a request for acceleration (further depression of the accelerator pedal) occurs immediately after vehicle starting, the required hydraulic pressure Pne increases in response to the request for acceleration. For that situation, even when a further request for acceleration is presented, the driving the electric oil pump M/O/P at the maximum rotational speed serves to shorten a time period when third hydraulic pressure P3 becomes equal to the increased required hydraulic pressure Pne, and thereby enhance the response of driving force.

In this embodiment, in order to enhance the fuel efficiency when the vehicle is stationary, while the axle rotational speed is equal to zero (namely, the vehicle speed is equal to zero), and the brake is in on-state, the idle stop control is performed to stop both of motor generator MG and auxiliary motor S/M. This causes the hydraulic pressure supply source OIL to stop supply of working oil, so that working oil is drained from hydraulic control circuit 100 including the line pressure oil passage 105 and others. This may cause a time lag from the occurrence of a request for vehicle start to a timing when power transmission becomes possible at the power transmission part such as continuously variable transmission CVT, because hydraulic control circuit 100 is not sufficiently filled with working oil when the request for vehicle start occurs. However, the feature of the embodiment that the low vehicle speed state rotational speed Nmax is set to the maximum rotational speed of electric oil pump M/O/P, serves to drive the electric oil pump M/O/P at the maximum output at vehicle start, and thereby allow the hydraulic control circuit 100 to be filled with working oil maximally smoothly. This serves to shorten the time lag until power transmission becomes possible at the power transmission part.

[Other Characteristic Actions]

The embodiment is configured to set the target rotational speed of electric oil pump M/O/P to the greater one of the predetermined lower limit rotational speed Nmin and the compensation state rotational speed Nα, wherein the compensation state rotational speed Nα is required to discharge the compensation flow rate Fα, wherein the compensation flow rate Fα is obtained by subtracting the discharge flow rate of mechanical oil pump O/P from the total required flow rate Fne, when the vehicle speed is between first vehicle speed V1 and second vehicle speed V2, namely, when it can be determined that the discharge flow rate of mechanical oil pump O/P is insufficient to cover the required hydraulic pressure Pne but variation of the discharge flow rate of mechanical oil pump O/P becomes small. Specifically, the embodiment is configured to set the second hydraulic pressure P2 to the compensation hydraulic pressure Pα obtained by subtracting the first hydraulic pressure from the required hydraulic pressure Pne, and thereby reduce the second hydraulic pressure P2 gradually, in response to a condition that the vehicle speed exceeds the first vehicle speed V1, because as the vehicle speed increases, the discharge flow rate of working oil from mechanical oil pump O/P increases, and the first hydraulic pressure P1 increases, and the possibility of further request for acceleration is low because the vehicle speed is increased. This serves to suppress the rotational speed of electric oil pump M/O/P, and suppress electric power consumption of auxiliary motor S/M.

Furthermore, when the compensation state rotational speed Nα is lower than the lower limit rotational speed Nmin while the vehicle speed is between first vehicle speed V1 and second vehicle speed V2, the target rotational speed of electric oil pump M/O/P is set to the lower limit rotational speed Nmin, where the lower limit value is limited by the lower limit rotational speed Nmin. The lower limit rotational speed Nmin is set based on the valve response speed of line pressure regulation valve 104 at which suitable pressure regulation can be performed by line pressure regulation valve 104, so that the output of electric oil pump M/O/P is suppressed not to be beyond the valve response speed of line pressure regulation valve 104, and the margin is provided for raising the pump rotational speed from zero to the target rotational speed Nth in the same time period (ta) as in the case of driving based on the maximum output. This serves to cause the rotational speed of electric oil pump M/O/P to rise at the same speed as with the maximum output, while allowing suitable pressure regulation of line pressure regulation valve 104, even if the driver-requested driving force increases by further depression of the accelerator pedal or the like after vehicle start. This serves to prevent the line pressure PL from hunting, and thereby prevent the transmission capacity of the power transmission part such as continuously variable transmission CVT from being below the input torque to the power transmission part, and prevent the power transmission part from slipping.

The following describes effects. The vehicular hydraulic control device according to the embodiment produces the following listed effects.

<1> A vehicular hydraulic control device includes: a first oil pump (mechanical oil pump O/P) configured to be driven by a vehicle drive source (motor generator MG), and perform hydraulic pressure supply; a second oil pump (electric oil pump M/O/P) configured to be driven by an electric motor (auxiliary motor S/M) other than the vehicle drive source (motor generator MG), and perform hydraulic pressure supply; and a second oil pump controller (integrated controller 10) configured to drive the second oil pump (electric oil pump M/O/P) in a manner to cause a second oil pump discharge pressure (second hydraulic pressure P2) to be greater than a compensation hydraulic pressure (Pα), in response to an occurrence of a driver-requested driving force when in a low vehicle speed region where a vehicle speed is lower than a first vehicle speed (V1), wherein the compensation hydraulic pressure (Pα) is obtained by subtracting a first oil pump discharge pressure (first hydraulic pressure P1) from a required hydraulic pressure (Pne), wherein the required hydraulic pressure (Pne) is determined in accordance with the driver-requested driving force. This serves to ensure the required hydraulic pressure (Pne) in response to an occurrence of a requested driving force when in a low vehicle speed region in which the output of the first oil pump (electric oil pump M/O/P) is unstable.

<2> The vehicular hydraulic control device is configures such that the second oil pump controller (integrated controller 10) is further configured to drive the second oil pump (electric oil pump M/O/P) in a manner to cause the second oil pump discharge pressure (second hydraulic pressure P2) to be equal to a maximum output pressure of the second oil pump (electric oil pump M/O/P). This serves to shorten a time period when a third hydraulic pressure (P3) becomes equal to an increased required hydraulic pressure (Pne), and thereby enhance the response of driving force, even when a further acceleration request is presented, in addition to the effect of <1>.

<3> The vehicular hydraulic control device is configures such that the second oil pump controller (integrated controller 10) is further configured to drive the second oil pump (electric oil pump M/O/P) in a manner to cause the second oil pump discharge pressure (second hydraulic pressure P2) to be equal to the compensation hydraulic pressure (Pα), while the vehicle speed is higher than or equal to the first vehicle speed (V1) and lower than or equal to a second vehicle speed (V2) higher than the first vehicle speed (V1). This serves to suppress the rotational speed of the electric oil pump (M/O/P), and thereby suppress electric power consumption of the auxiliary motor (S/M), when the first hydraulic pressure (P1) increases and the possibility of occurrence of a further acceleration request becomes low, in addition to the effect of <1> or <2>.

<4> The vehicular hydraulic control device is configures such that the second oil pump controller (integrated controller 10) is further configured to set a lower limit hydraulic pressure when causing the second oil pump discharge pressure (second hydraulic pressure P2) to be equal to the compensation hydraulic pressure (Pα), wherein the lower limit hydraulic pressure is set based on a valve response speed with which a pressure regulation valve (line pressure regulation valve 104) is capable of proper pressure regulation, wherein the pressure regulation valve (line pressure regulation valve 104) is configured to regulate a hydraulic pressure (third hydraulic pressure P3) produced by at least one of the first oil pump discharge pressure (first hydraulic pressure P1) and the second oil pump discharge pressure (second hydraulic pressure P2). This serves to suppress electric power consumption of the auxiliary motor (S/M), and when the driver-requested driving force increases, prevent the line pressure (PL) from hunting, and cause the rotational speed of the electric oil pump (M/O/P) to increase at the same speed as with the maximum output, and thereby prevent the transmission capacity of a power transmission part from being below an input torque.

Although the vehicular hydraulic control device according to the present invention has been described with reference to the embodiment as described above, specific configuration of the present invention is not limited to the embodiment, but may be carried out with design modification and addition without going out of the substance of the present invention related to the present claims.

The embodiment has the exemplified configuration that when the vehicle speed is lower than or equal to the first vehicle speed V1, the electric oil pump M/O/P is driven at the maximum rotational speed to set the second hydraulic pressure P2 to the maximum output pressure of electric oil pump M/O/P, but is not limited so. Electric oil pump M/O/P may be driven to set the second hydraulic pressure P2 greater than the required hydraulic pressure Pne but lower than the maximum output pressure. Mechanical oil pump O/P is driven by the vehicle drive source (motor generator MG) for outputting the driving force to the driving wheels, so that the rotational speed of electric oil pump M/O/P is limited depending on the state of drive. Namely, the target rotational speed of mechanical oil pump O/P cannot be set arbitrarily as that of electric oil pump M/O/P. Against that, the feature of setting the second hydraulic pressure P2 greater than the required hydraulic pressure Pne when in the low vehicle speed region where the vehicle speed is lower than first vehicle speed V1, serves to ensure the required hydraulic pressure Pne, irrespective of the discharge flow rate of mechanical oil pump O/P (first hydraulic pressure P1).

The embodiment has the exemplified configuration that as show in the time chart of FIG. 6, when the vehicle speed is between first vehicle speed V1 and second vehicle speed V2, until time instant t4', the compensation state rotational speed Nα is higher than the lower limit rotational speed Nmin, and the target rotational speed of the electric oil pump is set to the compensation state rotational speed Nα, but the present invention is not limited so. For example, since the required hydraulic pressure Pne is low, the target rotational speed of the electric oil pump may be set to the lower limit rotational speed Nmin immediately in response to a condition that the vehicle speed exceeds the first vehicle speed V1. Namely, when the vehicle speed is between first vehicle speed V1 and second vehicle speed V2, the target rotational speed of the electric oil pump may be set variably depending on the magnitude of required hydraulic pressure Pne.

The embodiment has the exemplified configuration that the present invention is applied to a scene where the vehicle is started by depression of the accelerator pedal from the stationary state of the vehicle where the vehicle speed is equal to zero (the axle rotational speed is equal to zero) with the brake on, but the present invention is not limited to this scene. For example, the present invention may be applied to a scene where the vehicle is accelerated by depression of the accelerator pedal for acceleration when the vehicle is running at a very low vehicle speed (lower than or equal to first vehicle speed V1), and thereafter change of the vehicle speed becomes small. Namely, the present invention may be applied to a scene only if the output of mechanical oil pump O/P is unstable in the scene, irrespective of whether the vehicle is stationary or running.

In the embodiment, the vehicular hydraulic control device according to the present invention is applied to the hybrid vehicle including the engine Eng and motor generator MG, but the present invention is not limited so. The vehicular hydraulic control device according to the present invention may be applied to an electric vehicle provided only with motor generator MG, or an engine vehicle provided only with engine Eng, or a plug-in hybrid vehicle, or a fuel cell vehicle, etc. Mechanical oil pump O/P may be driven by engine Eng.

The invention claimed is:

1. A vehicular hydraulic control device comprising:
   a first oil pump configured to be driven by a vehicle drive source, and perform hydraulic pressure supply;
   a second oil pump configured to be driven by an electric motor other than the vehicle drive source, and perform hydraulic pressure supply; and
   a second oil pump controller configured to perform a first operation of driving the second oil pump in a manner to cause a second oil pump discharge pressure to be greater than a compensation hydraulic pressure, in response to an occurrence of a driver-requested driving force when in a low vehicle speed region where a vehicle speed is lower than a first vehicle speed, wherein the compensation hydraulic pressure is obtained by subtracting a first oil pump discharge pressure from a required hydraulic pressure, wherein the required hydraulic pressure is determined in accordance with the driver-requested driving force.

2. The vehicular hydraulic control device as claimed in claim 1, wherein the second oil pump controller is further configured to implement the first operation by driving the second oil pump in a manner to cause the second oil pump discharge pressure to be greater than the required hydraulic pressure.

3. The vehicular hydraulic control device as claimed in claim 1, wherein the second oil pump controller is further configured to drive the second oil pump in a manner to cause the second oil pump discharge pressure to be equal to a maximum output pressure of the second oil pump.

4. The vehicular hydraulic control device as claimed in claim 1, wherein the second oil pump controller is further configured to drive the second oil pump in a manner to cause the second oil pump discharge pressure to be equal to the compensation hydraulic pressure, while the vehicle speed is higher than or equal to the first vehicle speed and lower than or equal to a second vehicle speed higher than the first vehicle speed.

5. The vehicular hydraulic control device as claimed in claim 4, wherein the second oil pump controller is further configured to set a lower limit hydraulic pressure when causing the second oil pump discharge pressure to be equal to the compensation hydraulic pressure, wherein the lower limit hydraulic pressure is set based on a valve response speed with which a pressure regulation valve is capable of proper pressure regulation, wherein the pressure regulation valve is configured to regulate a hydraulic pressure produced by at least one of the first oil pump discharge pressure and the second oil pump discharge pressure.

6. A vehicular hydraulic control method for a vehicular hydraulic control device, wherein the vehicular hydraulic control device includes: a first oil pump configured to be driven by a vehicle drive source, and perform hydraulic pressure supply; and a second oil pump configured to be driven by an electric motor other than the vehicle drive source, and perform hydraulic pressure supply;

the vehicular hydraulic control method comprising:
driving by a controller the second oil pump in a manner to cause a second oil pump discharge pressure to be greater than a compensation hydraulic pressure, in response to an occurrence of a driver-requested driving force when in a low vehicle speed region where a vehicle speed is lower than a first vehicle speed, wherein the compensation hydraulic pressure is obtained by subtracting a first oil pump discharge pressure from a required hydraulic pressure, wherein the required hydraulic pressure is determined in accordance with the driver-requested driving force.

* * * * *